United States Patent
Ell et al.

(10) Patent No.: US 6,493,177 B1
(45) Date of Patent: Dec. 10, 2002

(54) MICROACTUATOR ASSISTED SEEK AND HYSTERESIS CORRECTION METHOD AND APPARATUS FOR A DISK DRIVE

(75) Inventors: Travis E. Ell, Austin, TX (US); Arnold G. Slezak, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/697,960

(22) Filed: Oct. 27, 2000

Related U.S. Application Data
(60) Provisional application No. 60/193,212, filed on Mar. 30, 2000.

(51) Int. Cl.[7] ............................................. G11B 5/596
(52) U.S. Cl. .................................. 360/78.05; 360/78.12
(58) Field of Search ........................ 360/77.03, 78.05, 360/78.11, 78.12, 294.4, 75; 318/560, 615

(56) References Cited

U.S. PATENT DOCUMENTS

| | | | |
|---|---|---|---|
| 5,005,298 A | * | 4/1991 | Nagasawa et al. ............. 33/573 |
| 5,537,479 A | | 7/1996 | Kreisel et al. |
| 5,645,260 A | | 7/1997 | Falagas |
| 5,657,188 A | | 8/1997 | Jurgenson et al. |
| 5,711,063 A | | 1/1998 | Budde et al. |
| 5,714,831 A | | 2/1998 | Walker et al. |
| 5,764,444 A | | 6/1998 | Imamura et al. |
| 6,002,549 A | | 12/1999 | Berman et al. |
| 6,072,665 A | | 6/2000 | Ferrari et al. |
| 6,088,187 A | | 7/2000 | Takaishi |
| 6,101,058 A | * | 8/2000 | Morris ......................... 360/69 |
| 6,163,434 A | * | 12/2000 | Zhang ...................... 360/294.5 |
| 6,211,638 B1 | * | 4/2001 | Heaton ......................... 318/560 |

FOREIGN PATENT DOCUMENTS

| WO | WO 98/48415 | 10/1998 |
|---|---|---|
| WO | WO 99/66501 | 12/1999 |

\* cited by examiner

Primary Examiner—Andrew L. Sniezek
(74) Attorney, Agent, or Firm—Fellers, Snider, et al.

(57) ABSTRACT

Apparatus and method for positioning a head in a disc drive using a dual stage actuator having a primary actuator motor for coarse head positional control and a microactuator motor for fine head positional control. The microactuator motor includes a strain gauge affixed to a piezoelectric transducer measuring actual dimensional change of the microactuator motor resulting from response by the piezoelectric transducer to a request for head repositioning. A closed loop servo control circuit generates control inputs for the dual stage actuator to carry out track following and seek operations while adjusting head position by correcting piezoelectric transducer hysteresis and reducing seek and settle times.

10 Claims, 4 Drawing Sheets

MICROACTUATOR ASSISTED SEEK AND HYSTERESIS CORRECTION METHOD AND APPARATUS FOR A DISK DRIVE

RELATED APPLICATIONS

This application claims priority to United States Provisional Application No. 60/193,212 filed Mar. 30, 2000.

FIELD OF THE INVENTION

This invention relates generally to the field of magnetic data storage devices, and more particularly, but not by way of limitation, to an apparatus and method for controlling correction of microactuator induced hysteresis errors and microactuator assisted seeks of a disc drive actuator.

BACKGROUND

Disc drives are used as primary data storage devices in modern computer systems and networks. A typical disc drive comprises a head-disc assembly (HDA) which houses mechanical portions of the drive, and a printed circuit board (PCB) mounted to an outer surface of the HDA which supports electronic circuitry used to control the HDA.

Typically, a HDA comprises one or more magnetic discs that are affixed to and rotated by a spindle motor at a constant high speed and an actuator assembly, which supports an array of heads adjacent tracks defined on the disc surfaces. The surface of each disc is a data recording surface divided into a series of generally concentric recording tracks radially spaced across a band having an inner diameter and an outer diameter. The data tracks extend around the disc and store data within the tracks on the disc surfaces in the form of magnetic flux transitions. The flux transitions are induced by an array of transducers, otherwise commonly called read/write heads or heads. Typically, each data track is divided into a number of data sectors that store fixed-size data blocks.

The head includes an interactive element such as a magnetic transducer, which senses the magnetic transitions on a selected data track to read the data stored on the track. Alternatively, the head transmits an electrical signal that induces magnetic transitions on the selected data track to write data to the track. As is known in the art, each read/write head is mounted to a rotary actuator arm and is selectively positionable by the actuator arm over a selected data track of the disc to either read data from or write data to the selected data track. Each head includes a slider assembly with an air-bearing surface that causes the read/write head to fly above the disc surface. The air bearing is developed as a result of load forces applied to the read/write head by a load arm interacting with air currents that are produced by rotation of the disc.

An actuator motor, such as a voice coil motor (VCM), rotates the actuator assembly, and hence the heads, across the disc surfaces. The control circuitry on the PCB includes a read/write channel which interfaces with the heads to transfer data between the tracks and a host computer, and a servo control system which drives the VCM to provide head positional control, based on the information contained in the servo field.

Continued demand for disc drives with ever increasing levels of data storage capacity and data throughput have led disc drive manufacturers to seek ways to increase the storage capacity of each disc surface and improve operating efficiencies of the disc drive. High performance disc drives of the present generation typically achieve areal bit densities measured in several gigabits per square centimeter, Gbits/$cm^2$. Higher recording densities can be achieved by increasing the number of bits stored along each track, and/or by increasing the number of tracks per unit width across each disc. Storing more bits along each track generally requires improvements in the read/write channel electronics to enable the data to be written (and subsequently read) at a correspondingly higher frequency. Providing higher track densities generally requires improvements in the servo control system to enable the heads to be more precisely positioned over the discs. Improved operating efficiencies or throughput performance, for any given bit density, results from reduced cycle times in performing functions or through elimination and/or incorporation of functions internal to the other.

Throughput performance is enhanced during read/write cycles by stabilizing the ability of the servo system to hold the head on track under adverse conditions such as an occurrence of servo field thermal asperity; rotational vibration; resonance of rigid bodies at frequencies sympathetic to the servo frequencies; or components of runout, velocity and acceleration (commonly referred to as RVA) drifting out of tolerance.

To improve on track performance and seek performance for disc drives of higher track densities, disc drive manufacturers are increasingly moving to implement so-called "microactuator motors" or "microactuators," which are secondary motors suspended by actuator assemblies to provide fine (secondary) positional adjustment of the heads over and above the coarse (primary) positional adjustment provided by the VCMs. A variety of microactuator constructions have been recently proposed in the art, including the use of an inductive rotor/stator arrangement as exemplified by U.S. Pat. No. 5,657,188 issued to Jurgenson et al.; the use of piezoelectric transducers as exemplified by U.S. Pat. No. 6,002,549 issued to Berman et al.; and microelectronic machine (MEM) implementations as discussed in U.S. Pat. No. 5,711,063 issued to Budde et al.

The basic operational concept of an actuator assembly with both primary and secondary motors (also referred to as a "dual-stage" actuator) is relatively straightforward; the primary motor is used to bring the selected head within a given range of tracks or to a selected track, after which the secondary motor operates to bring the head over track center of the selected track. While improvements have been made within dual stage actuator technology that dramatically improve head positioning, essentially through the introduction and integration of microactuators into the servo system, challenges remain with maximizing microactuator capability and correcting head position deficiencies stemming from microactuator motor hysteresis.

SUMMARY OF THE INVENTION

The present invention provides an apparatus and method of effectuating microactuator assisted seeks and hysteresis corrected head positioning functions for expanding microactuator utility in improving disc drive read/write head placement position relative to a data track.

In accordance with preferred embodiments, a disc drive is provided with a rotatable actuator which supports an array of read/write heads adjacent a corresponding number of recording surfaces in a rotatable disc stack. A servo controller providing a closed loop primary servo control circuit with a closed loop piezo servo circuits generates control inputs for the actuator to carry out track following operations wherein a selected head is caused to follow a corresponding track.

The actuator is characterized as a dual-stage actuator having both a primary actuator motor (VCM), which controllably moves all heads simultaneously, and an array of secondary microactuator motors which controllably move each head individually. Each microactuator preferably has a piezoelectric transducer (PZT) construction and undergoes a dimensional change in response to application of an electric field. Attached to each microactuator is a sensor, such as a strain gauge, which provides a changed electrical resistance in response to a dimensional change imparted to the strain gauge. Hence, actual dimensional change in the microactuator can be directly measured by the sensor.

Control inputs for the motors are determined in relation to an actual position signal for the head, a desired position signal or target track seek request from a control processor and a set of control limits. The control limits are individually determined and loaded into a volatile memory for the selected head at start-up and then as needed for subsequently selected heads throughout the operation of the disc drive. The control limits are initially captured and stored in a head accessible nonvolatile memory location on the disc drive. The control limits are developed by measuring voltage output responses for each microactuator in response to voltage inputs applied to the individual microactuators and the response of each head disc pairing to seek commands.

Each set of control limits comprises the results of the voltage measurements and calculations made on those voltage measurements. The measurements are made during the manufacturing process. The use of a different set of control limits by head enables a servo controller to be adapted for each head/disc combination. That is, as each new head is selected, a new set of control limits appropriate for the new head is loaded into a volatile memory of a servo engine thereby providing accurate, adaptive control.

The primary servo control circuit is a closed loop control circuit that serves, primarily, to control functions of the dual stage actuator during track following and seek requests. A closed loop piezo servo circuit is integrated into the primary servo control circuit and has the ability to operate separately from the primary servo control circuit, having once received input from the primary servo control circuit.

Included within the closed loop piezo servo circuit is a hysteresis correction circuit that monitors and adjusts the position of the head relative to the data track based on an actual physical response of a microactuator to a request for a head positional adjustment. The hysteresis correction circuit monitors the actual physical response of the microactuator to the head position adjustment request and adjusts the input voltage to the microactuator until the actual physical response of the microactuator matches the theoretical physical response of the actuator inherently intended by the original head reposition request. Microactuator hysteresis correction occurs absent servo fields supplied head position data and can occur simultaneous to data transfer functions.

These and various other features and advantages, which characterize the present invention, will be apparent from a reading of the following detailed description and a review of the associated drawings.

DETAILED DESCRIPTION

Figure 1:
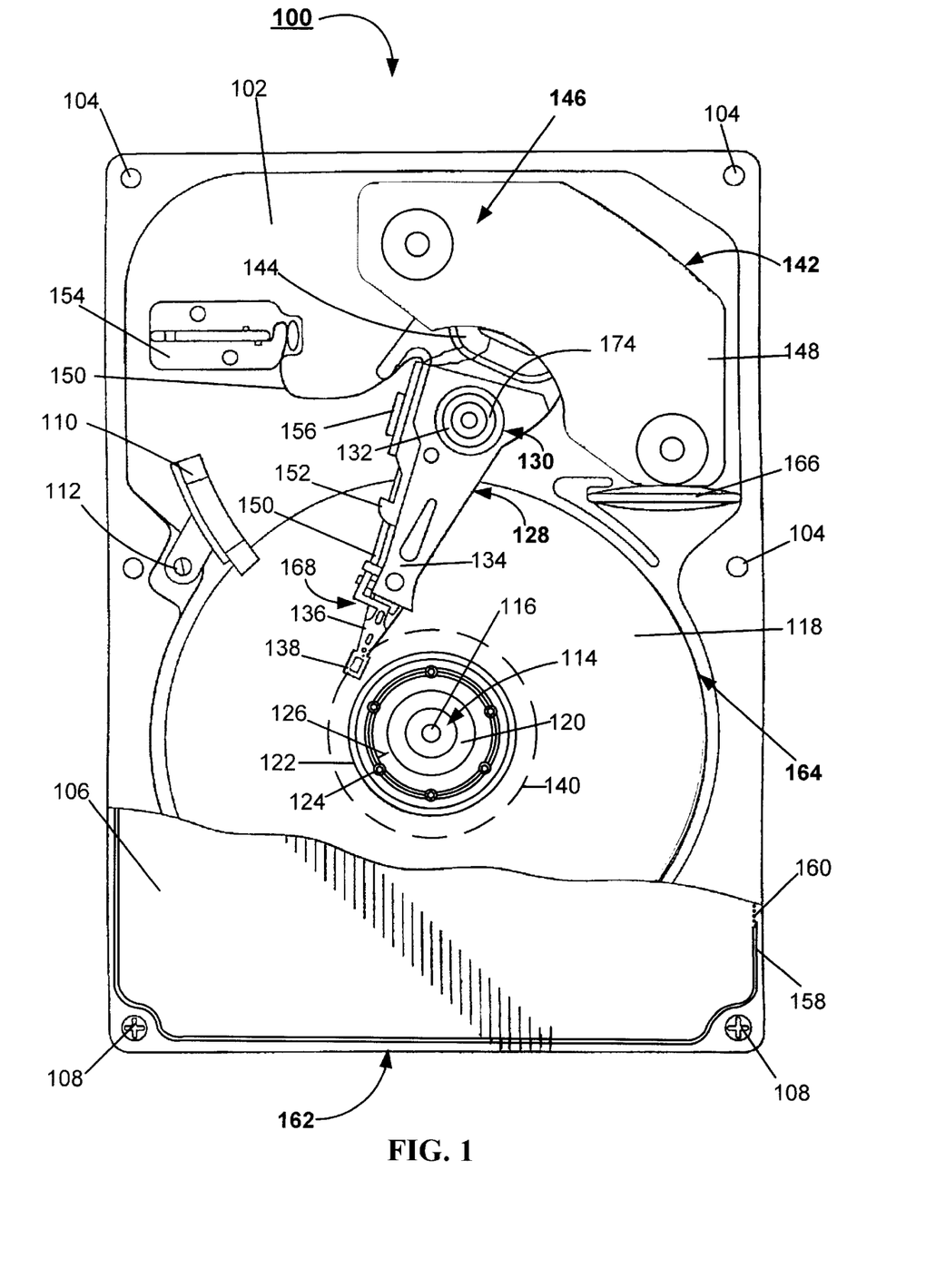
FIG. 1 is a top plan view of a disc drive in accordance with preferred embodiments of the present invention.

Referring to the drawings in general, and more particularly to FIG. 1, shown therein is a top view of a disc drive 100 constructed in accordance with the present invention. The disc drive 100 includes a basedeck 102 that has several fastener receptacles 104, the basedeck 102 supporting various disc drive components, and a top cover 106 (shown in part), with several mounting apertures (not separately shown), secured to the basedeck 102 by top cover fasteners 108. The installed top cover 106 together with the basedeck 102 provides a sealed internal environment for the disc drive 100. Numerous details of and variations for the construction of the disc drive 100 are not included in the following description as such are well known to those skilled in the art and are believed to be unnecessary for the purpose of describing the present invention.

Mounted to the basedeck 102 is a ramp load snubber assembly 110 secured to the basedeck 102 by a fastener 112, and a spindle motor 114 with a top cover attachment aperture 116. The spindle motor 114 supports several axially aligned rotatable discs 118 for rotation at a constant high speed, the discs 118 mounted on a spindle motor hub 120 that are secured by a clamp ring 122 with clamp ring fasteners 124. In addition to providing support for the stacked discs 118, the spindle motor hub 120 also provides a timing mark 126 used during the assembly process to reference the angular location of a source of rotational imbalance. Adjacent the discs 118 is a dual stage actuator 128 (also referred to as an "E-block" or a head stack assembly (HSA)) which pivots about a bearing assembly 130 in a rotary fashion. The bearing assembly supports a beveled pick and place member 132 that serves as a tooling grip during assembly operations. The HSA 128 includes actuator arms 134 (only one shown) that support load arms 136. Each load arm 136 in turn supports read/write heads 138, with each of the read/write heads 138 corresponding to a surface of one of the discs 118. As mentioned, each of the discs 118 has a data recording surface divided into concentric circular data tracks 140 (only one shown), and the read/write heads 138 are located over data tracks to read data from, or write data to, the tracks.

The HSA 128 is controllably positioned by a voice coil motor assembly (VCM) 142 (also referred to herein as a primary actuator motor 142), comprising an actuator coil 144 immersed in the magnetic field generated by a magnet assembly 146. A magnetically permeable flux path is provided by a steel plate 148 (also called a top pole piece) mounted above the actuator coil 144 to complete the magnetic circuit of the VCM 142.

When controlled current is passed through the actuator coil 144, an electromagnetic field is setup, which interacts with the magnetic circuit of the VCM 142 to cause the actuator coil 144 to move relative to the magnet assembly 146 in accordance with the well-known Lorentz relationship. As the actuator coil 144 moves, the HSA 128 pivots about the bearing assembly 130, causing the heads 138 to move over the surfaces of the discs 118 thereby allowing the heads 138 to interact with the data tracks 140 of the discs 118. When the disc drive 100 is turned off, the VCM 142 parks the HSA 128 on the ramp load snubber assembly 110 to avoid shock induced contact between the read/write heads 138 and the discs 118.

To provide the requisite electrical conduction paths between the read/write heads 138 and disc drive read/write circuitry (not shown), read/write head wires (not shown) are affixed to a read/write flex circuit 150. The read/write flex 150 is routed from the load arms 136 along the actuator arms 134 and into a flex circuit containment channel 152 and on to a flex connector body 154. The flex connector body 154 supports the flex circuit 150 during passage of the read/write flex circuit 150 through the basedeck 102 and into electrical communication a disc drive printed circuit board assembly (PCBA) (not shown) mounted to the underside of the basedeck 102. The flex circuit containment channel 152 also supports read/write signal circuitry including preamplifier/driver (preamp) 156 used to condition read/write signals passed between the read/write circuitry (not shown) and the read/write heads 138. The disc drive PCBA provides the disc drive read/write circuitry, which controls the operation of the heads 138, as well as other interface and control circuitry for the disc drive 100.

The HSA 128 is characterized as a "dual-stage" actuator in that the actuator has a primary actuator motor VCM 142, which provides coarse positional control, and an array of microactuators (MA) 168, also referred to as a piezo plant 168, which provides fine head position control. As described hereinabove, passing current through the VCM 142 causes the actuator coil 144 to move relative to the magnet assembly 146, which in turn pivots the HSA 128 about the bearing assembly 130, positioning all heads 138 simultaneously over the surfaces of the discs 118, resulting in each head 138 being positioned over a data track 140, thereby allowing the heads 138 to interact with the data track 140 of the discs 118.

Each MA 168 includes at least one piezoelectric transducer member 212 (shown in FIG. 3) that expands and contracts in response to application of a piezoelectric transducer voltage (PZT voltage). Ideally, application of the PZT voltage across the piezoelectric transducer 212 during track following functions causes the head to move relative to the data track 140 to position the head 138 at track center of the data track 140. Upon attaining track center positioning of the head, the applied PZT voltage is reversed to zero at a rate commensurate with current applied to the VCM 142 attaining a level just sufficient to offset a positional bias encountered by the HSA 128 at data track 140. The PZT voltage reversal rate causes movement of the load arm 136 relative to the actuator arm 134, while holding the head 138 stable at track center of data 140. Simultaneous with application and reverse application of PZT voltage across the piezoelectric transducer 212, the VCM 142 moves the actuator arm 134 relative to the load arm 136 in a direction opposite to the direction of motion of the load arm 136 created by reversal of the PZT voltage applied across the piezoelectric transducer 212. Movement of the actuator arm 134 by the piezoelectric transducer 212 and the VCM 142 discontinues when the level of current applied to the VCM 142 attains the level just sufficient to offset the positional bias encountered by the HSA 128 at data track 140, which coincides with the application of zero PZT voltage across the piezoelectric transducer 212 during the track following function.

Additionally, and under ideal conditions, application of the PZT voltage during seek functions causes the head to move relative to the data track 140 in the direction of the seek, positioning the head 138 closer to a new target data track 140. During seek functions a maximum absolute value (either positive or negative) PZT voltage is applied to the piezoelectric transducer 212, causing the piezoelectric transducer 212 to attain its maximum dimensional extension or minimum contraction resulting in maximum head extension.

Upon nearing seek complete, reading head position data and attaining track center positioning of the head, the applied PZT voltage is reversed to zero at a rate commensurate with seek current applied to the VCM 142 attaining a level just sufficient to offset a positional bias encountered by the HSA 128 at the new target data track 140. Again, the PZT voltage reversal rate causes movement of the load arm 136 relative to the actuator arm 134, while holding the head 138 stable at track center of the new target data track 140. And again, simultaneous with application and reverse application of PZT voltage across the piezoelectric transducer, the VCM 142 is moving the actuator arm 134 relative to the load arm 136 in a direction opposite to the direction of motion of the load arm 136 caused by reversal of the PZT voltage applied across the piezoelectric transducer 212. Movement of the actuator arm 134 by the piezoelectric transducer 212 and the VCM 142 discontinues when the level of seek current applied to the VCM 142 reaches a current just sufficient to offset the positional bias encountered by the HSA 128 at the new target data track 140, which coincides with returning the applied PZT voltage driving the piezoelectric transducer 212 to zero.

Movement of the head 138 relative to the data track 140 resulting from application of PZT voltage across the piezoelectric transducer 212 occurs more quickly than movement of the head 138 relative to the data track 140 resulting from application of current to the VCM 142. The reduced time taken for head 138 movement realized by utilizing the MA 168 during seek functions, reduces the overall seek time (most dramatically for single head seeks). Reduction in PZT voltage occurs at a rate commensurate with seek current applied to the VCM 142 attaining the level of current just sufficient to offset a positional bias encountered by the HSA 128 at the new target data track 140. This offset in positional bias reduces settle time by damping head oscillation. Collectively, the reduction in seek and settle times improves overall performance of disc drive 100.

As discussed more fully below, a sensor, preferably a strain gauge, is affixed to each MA 168 to provide a direct measurement of the actual physical displacement of each MA for closed loop control and hysteresis error correction. Control signals for the VCM 142 and the MA 168, and read/write signals for the heads 118, are passed between the HSA 128 and the disc drive PCB via a flex circuit assembly 150.

Since it is contemplated that only one head 138 will be selected at a time to perform data transfer functions, on track or track follow servo control signals are generated for the VCM 142 and the appropriate MA 168 in order to carry out the desired servo control for the selected head; switching to a new head results in the use of a different MA 168 appropriate for the new head.

Each MA 168 operates within a range of capability in response to an application of PZT voltage. Absent an applied PZT voltage to the MA 168, the physical attributes of the MA 168 remain unchanged. The response of the MA 168 to an application of a PZT voltage is to expand or contract in a predetermined planar direction. However, the capability of expansion of the MA 168 is bound by the physical characteristics of the MA 168. Application of PZT voltage to the MA 168 to induce movement beyond the maximum capabilities of the MA 168 results in no further dimensional change to the MA 168. For a preferred embodiment, utilizing a single MA 168 for each load arm 136, the initial PZT voltage applied to the MA 168 is set at zero. It should be noted, for any given MA 168 configuration, the number of tracks serviceable by the MA 168 depends on the track density technology in use and not the physical attributes of the MA 168 alone.

As the physical capabilities of each MA 168 is of importance in implementing the present invention, the techniques used in determining the capabilities of each MA 168, along with the circuitry of the PCB, will now be discussed with reference to FIG. 2. A programmable processing device, characterized as a control processor 172, provides top level control of the disc drive in response to programming stored in processor memory (MEM) 174 and command inputs from the host computer 170, including selection of a specific data track 140 or target data track 140 to be accessed in response to a seek request. Data are transferred between the host computer 170 and the discs 118 along a communication path including an interface (I/F) circuit 176, read/write channel 178 and preamplifier/driver (preamp) 156. The preamp 156 is affixed to the read/write flex 150, as shown in FIG. 1.

HSA 128 positional control is provided by a primary or closed loop servo circuit 180 that includes a demodulator (demod) 182, an application specific integrated circuit (ASIC) hardware-based servo controller ("servo engine") 184 (which includes a DSP portion 186 and a volatile memory portion 188), a digital to analog converter (DAC) 190, a motor driver circuit 192, the VCM 142, the head 138, the preamplifier 156, and the read/write channel 178. The components of the closed loop servo circuit 180 discussed to this point are utilized to facilitate track following and seek functions for both the piezo plant 168 and the VCM 142.

The demodulator 182 conditions servo data transduced from the disc 118 to provide an indication of the position of the head 138 relative to a data track, also known as head position information. The servo engine 184 generates: command signals in the form of velocity based seek signals used by VCM 142; piezo plant input voltages or signals used in directing track following adjustments and responding to seek requests by the MA 168; and track following signals used by the VCM 142 to maintain HSA 128 position during data transfer. The command signals are converted by the DAC 190 to analog control signals for use by the motor driver 192.

The remaining components of the closed loop servo circuit 180 include a summing junction 196 and a zero-order hold device (ZOH) 198. These additional components, in conjunction with piezo driver 194, are used by the disc drive 100 to facilitate head positioning executed by the microactuator 168. Finally, a hysteresis correction circuit 200 and an observer circuit [observer] 204) is incorporated as a component of the closed loop servo circuit 180. In drive operations, the sense circuit 202 receives a resistance input from the piezo plant 168, and the observer 204 receives a piezo plant input voltage from the summing junction 196. The piezo plant input voltage 196 represents the level of voltage the piezo driver 194 drives the piezo plant 168 to either bring the head 138 to track center or to facilitate extension or contraction of the piezo plant in response to a seek command.

The voltage driving the piezo plant 168 is a piezo inducement signal or voltage. In response to the voltage input from the piezo driver 194, the piezo plant 168 either expands or contracts its physical dimension and, in so doing, provides a change in resistance commensurate with the actual physical expansion or contraction of by the piezo plant 168. The sense circuit 202 responds to receipt of the resistance change by generating a displacement signal in the form of a sense circuit output voltage. The sense circuit output voltage is representative of a driving voltage the piezo plant 168 would have needed to effectuate the actual dimensional change had the piezo plant 168 responded to the driving voltage absent piezo plant hysteresis. In other words, if the piezo plant 168 were a device absent the effects of hysteresis, in response to a given voltage input, the piezo plant 168 would undergo a repeatable linear dimensional change. However, as a piezo plant 168 is susceptible to hysteresis and response to a given voltage input is not a linearly repeatable corresponding dimensional change in the piezo plant 168, corrective measures are employed.

Each piezo plant 168 has a theoretical linear relationship between voltage input and dimensional change that is specific to the material use and construction of the piezo plant. The sense circuit 202 is selected to generate an output voltage based on an actual dimensional change of the piezo plant 168 in responding to a given PZT voltage input. The output voltage generated by the sense circuit 202 equals the theoretical input voltage the piezo plant 168 should have used to effectuate the actual change in dimension of the piezo plant 168 in response to the applied PZT voltage input. The observer 204 generates an expected piezo plant response signal in the form of a voltage based on the piezo plant input voltage received from the summing junction 196. The expected piezo plant response voltage is calibrated to correlate to the theoretical dimensional change or expected microactuator motor dimensional change the piezo plant 168 should have encountered in response to the applied (PZT) voltage.

The observer 204 receives, as input, the output voltage generated by the sense circuit 202. The observer 204 compares the expected piezo plant response voltage to the actual piezo plant response voltage to determine whether the physical response of the piezo plant 168 corresponds to a dimensional change the piezo plant 168 should have undergone based on the piezo plant input voltage received from the summing junction 196. If the observed dimensional change in the piezo plant 168 corresponds to the expected dimensional change in the piezo plant 168, the observer 204 does nothing to update the summing junction 196 with a piezo plant correction voltage. However, if the observer 204 detects a discontinuity in the observed dimensional change of the piezo plant 168 and the expected dimensional change in the piezo plant 168, the observer 204 dispatches the piezo plant correction voltage to the summing junction 196. Upon receipt of a correction voltage from the observer 204, the summing junction 196 combines the piezo plant correction voltage with the piezo plant input voltage and provides a corrected piezo plant input voltage. The voltage level of the corrected piezo plant input voltage facilitates the amount of dimensional correction the piezo plant 168 needs to undergo to attain the dimensional change indicative of the theoretical dimensional change corresponding to the original piezo plant input voltage to the summing junction 196.

In describing the overall operation of a preferred embodiment of the servo circuit 180, the demodulator 182 will serve as the entry point and, for discussion purposes, the disc drive 100 is taken to be engaged in data transfer functions between the host computer 170 and the disc 118 and the disc drive 100 is an embedded servo type disc drive. Based on those conditions, the demodulator 182 conditions servo data transduced from the disc 118 to provide an indication of the position of the head 138 relative to the selected data track on the disc 118. The output of the demodulator 182 is input to the servo engine 184. The servo engine 184 utilizes the demodulator 182 input as a basis for determining the appropriate change in input current, if any, required by the VCM 142 and the input voltage, if any, required by the piezo plant 168 to maintain the head 138 at track center in a track following mode relative to the selected data track 140.

During track following mode, the servo engine 184 updates the input current required by the VCM 142 to a level above the bias current. Also during the track following mode, the servo engine 184 updates the input voltage required by the piezo plant 168 to maintain the positional relation of a head 138 relative to the selected data track 140 based on input updates from the demodulator 182. The input voltage required by the piezo plant 168 has a value greater than or less than zero. The demodulator 182 issues updates based on positional information received from the read/write channel 178. The read channel 178 receives positional information each time the head 138 encounters one of the embedded servo fields on the selected track.

If the input from the demodulator 182 reveals a need for a positional correction of the head 138, the servo engine 184 determines whether the required correction can be accomplished through utilization of the piezo plant 168 or needs an engagement of the VCM 142. To make this determination, the servo engine 184 calculates a voltage needed by the piezo plant 168 and the current needed by the VCM 142 to accomplish the positional correction. Next, the servo engine 184 applies the needed current to the VCM 142 and the voltage to the piezo plant 168. The piezo plant 168 responds to the input more quickly than does the VCM 142. With feedback from the hysteresis correction circuit 200, the piezo plant 168 pulls the head 138 to track center of the data track 140. As current is applied to the VCM 142, voltage driving the piezo plant 168 is reduced to zero at a rate commensurate with the VCM 142 achieving a current level just sufficient to offset actuator bias encountered by the HSA 128 at the data track 140.

During operation of the disc drive 100, when the servo engine 184 determines a positional adjustment of the head 138 is needed outside the range of the piezo plant 168, i.e., a seek command, the servo engine 184 communicates with the control processor 172, which in turn queries the processor memory 174 to obtain a seek profile to be executed by VCM 142 in facilitating the positional adjustment of the head 138. Under a VCM 142 executed seek, the control processor 172 communicates the appropriate seek profile to the servo engine 184, the servo engine 184 generates seek command signals which are converted by the DAC 190 for use by the motor driver 192. The motor driver 192 applies the seek command signals to the VCM 142 by passing controlled current through the actuator coil 144 of the VCM 142. When controlled current is passed through the actuator coil 144 the magnetic circuit of the VCM 142 causes the actuator coil 144 to move relative to the magnet assembly 146 pivoting the HSA 128 about the bearing assembly 130, causing the heads 138 to move over the surfaces of the discs 118.

Upon receipt of the piezo activation voltage from the zero-order hold device 198, the piezo driver 194 drives a constant piezo inducement voltage across the piezo plant 168 to facilitate a full extension or full contraction of the piezo plant 168 position, depending on the direction of the seek, on entering seek functions.

Simultaneously with generating seek command signals for the VCM 142, the servo engine 184 provides command signals to the summing junction 196. The summing junction 196 directs the command signal, or piezo plant input voltage, to the zero-order hold device 198 and the observer 204. The zero-order hold device 198 receives the piezo plant input voltage from the summing junction 196 and outputs a piezo activation voltage corresponding to the piezo plant input voltage and maintains the piezo activation voltage as an output until an update of the piezo plant input voltage is received from the summing junction 196.

With the read gate open during seek functions, upon interaction with the target data track 140, the head 138 first reads positional data located on the disc 118, passes the information through the preamp 156, the read/write channel 178, the demodulator 182 and into the control processor 172. The control processor 172 analyzes the data read to determine whether additional positional changes need to be made to the head 138. Any required adjustments needed to bring the head 138 on track are conveyed to the servo engine 184 and the servo engine 184 determines whether the adjustments are to be made by activation of the piezo plant 168 or through further seek functions. Once the control processor 172 determines that the head 138 is on track and ready to interchange data between the host computer 170 and disc 118, the control processor 172 relinquishes positional control of head 138 to the servo engine 184 and the servo engine 184 operates as described hereinabove.

Figure 3:
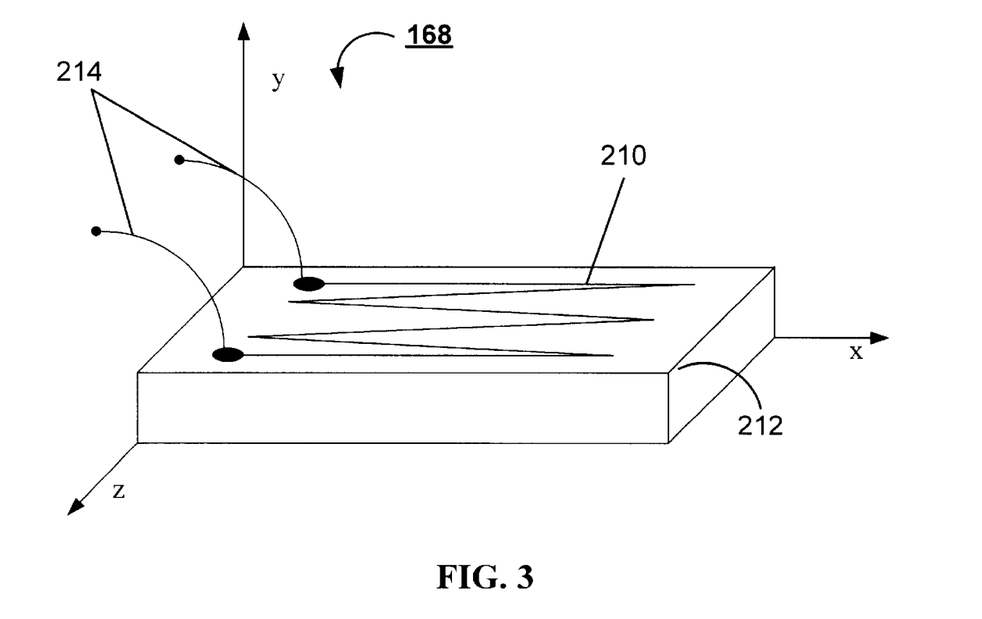
FIG. 3 provides a perspective view of the piezo plant of a type in accordance with preferred embodiments of the present invention.

FIG. 3 shows the piezo plant 168 includes a microactuator motor 212. In a preferred embodiment, the microactuator motor 212 is a piezoelectric transducer member 212. A strain gauge 210 is attached to the surface of the piezoelectric transducer member 212 and a pair of conductive leads 214 are attached to the strain gauge 210. The piezoelectric transducer member 212 provides the ability of the piezo plant 168 to undergo a dimensional change in response to application of a voltage across the piezoelectric transducer member 212. The predictability and relative repeatability of the amount of force and dimensional change per unit mass the piezoelectric transducer member 212 is capable of producing in response to an incremental increase in voltage makes the piezoelectric transducer member 212 a good choice for a microactuator such as piezo plant 168. A particularly favorable characteristic of piezoelectric transducer 212 is the ability to set, during the manufacturing process of the piezoelectric transducer member 212, the planar direction of dimensional change the piezoelectric transducer member 212 will undergo in response to an applied voltage.

Although the direction of dimensional change the piezoelectric transducer member 212 undergoes in responding to an applied voltage is both highly predictable and highly repeatable, the amount of actual physical dimensional change delivered by a particular piezoelectric transducer member 212 for incremental dimensional changes is less predictable and less repeatable. This unpredictability is referred to as hysteresis, or a retardation of the effect on a body when the forces acting upon the body are changed.

The addition of the strain gauge 210 to the piezoelectric transducer member 212 within the piezo plant 168 provides a vehicle for direct measurement of the amount of incremental dimensional change experienced by the piezoelectric transducer member 212 in response to the application of an incremental PZT voltage. When the piezoelectric transducer member 212 expands or contracts in a predetermined direction, for example, in a positive x direction as shown in FIG. 3, the strain gauge 210 increases in resistance. When the piezoelectric transducer member 212 contracts in a negative x direction, the strain gauge 210 decreases in resistance. As the preferred relationship between the change in resistance experienced by the strain gauge 210 and the dimensional change of the piezoelectric transducer member 212 is a linear one, prudence and diligence must be given to the selection of the material use for constructing the strain gauge 210 to assure a match between the coefficients of thermal expansion of the piezoelectric transducer member 212 and the strain gauge 210.

Figure 2:
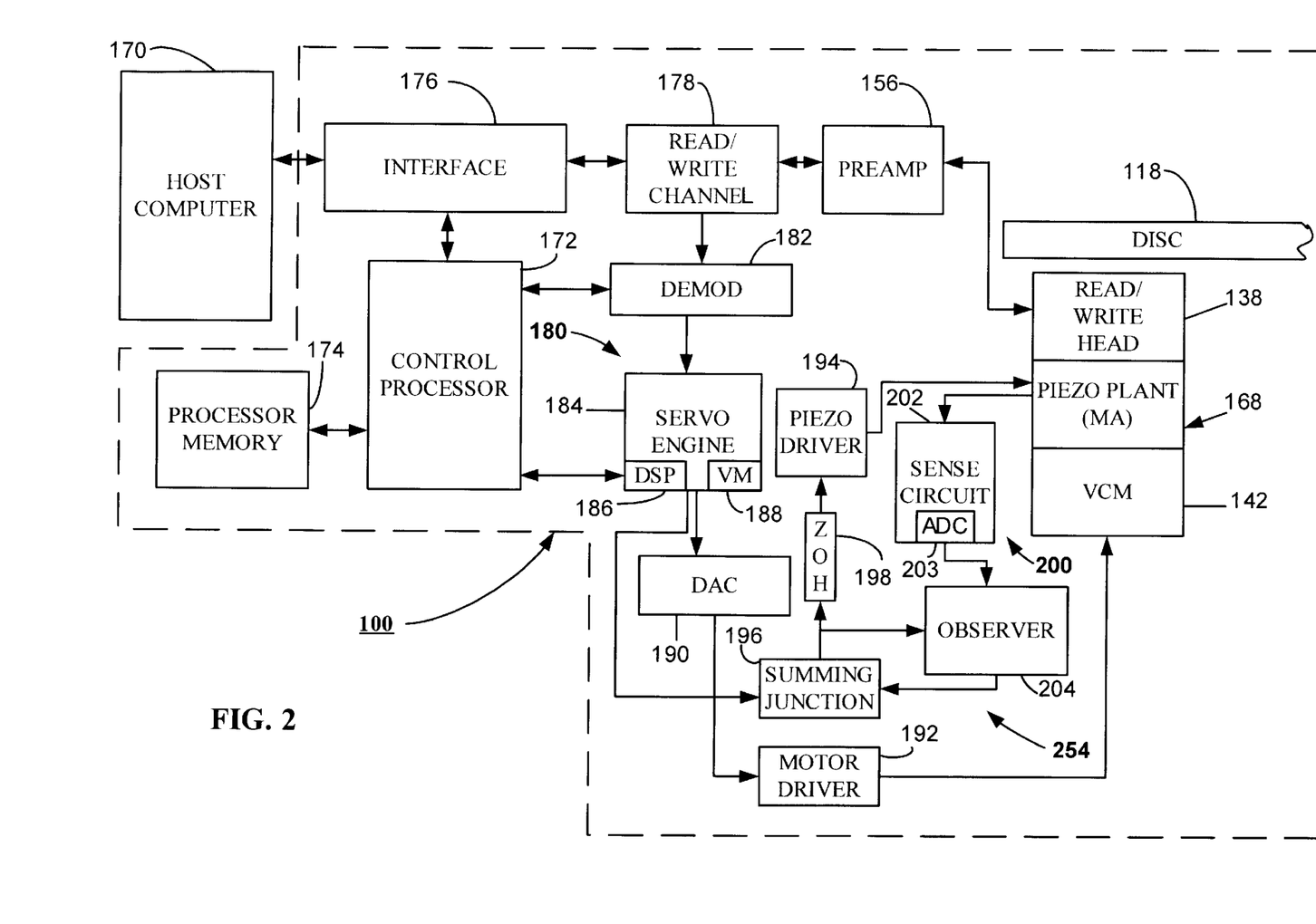
FIG. 2 is a functional block diagram of control circuitry of the disc drive of FIG. 1.
Figure 4:
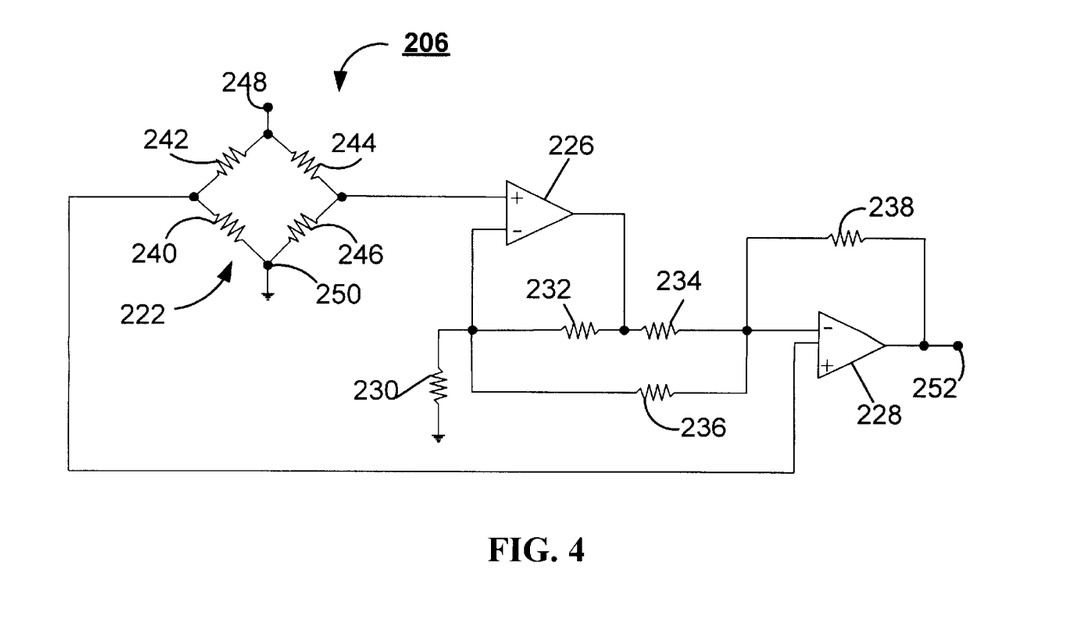
FIG. 4 shows a schematic diagram of a sense circuit in accordance with preferred embodiments of the present invention.

Through use of a sense circuit 202 of FIG. 2, the conductive leads 214 of the piezo plant 168 provide the ability to monitor and respond to the changes in resistance experienced by the strain gauge 210 as the microactuator motor 212 undergoes dimensional changes, thereby providing a vehicle for implementing a microactuator motor hysteresis correction method. As shown by FIG. 4, the sense circuit 202 includes a resistor bridge network 222, a pair of operational amplifiers (op amps) 226 and 228, and resistors 230 through 238 used to balance the sense circuit 202. The resistor bridge network 222 includes resistors 240, 242, 244 and 246. The strain gauge 210 is hooked into the resistor bridge network 222 via the conductive leads 214 of the piezo plant 168 and is represented in FIG. 4 by resistor 240. The two op amps 226 and 228 measure change in voltage of the resistor bridge network resulting from changes in resistance of the strain gauge 210 responding to dimensional changes in the piezoelectric transducer member 212. A voltage source is applied across the resistor bridge network 222 at nodes 248 and 250 and a displacement signal, in the form of a voltage level relative to ground, is generated by the sense circuit 202 as an output at node 252 and provided as an input to the observer 204 of FIG. 2.

In a preferred embodiment, the values and/or characteristics of the components of the sense circuit 202 are as follows. The voltage level applied across the resistor bridge network 222 is 5 V. The resistance 240 of the strain gauge 210 across the conductive leads 214, when no voltage is applied to the piezoelectric transducer 212, is 120 ohms. The resistance of the resistors 242, 244 and 246 are each set at 120 ohms. The operational amplifiers 226 and 228 are high precision, 6 MHz rail-to-rail output operational amplifiers, such as a National Semiconductor low power, analog operational amplifier part number LMC2001. The resistor 230 is a 0.1% 10 k ohm resistor. The resistors 232 and 234 are each 1% 2 k ohm resistors. The resistor 236 is a 200 ohm resistor and the resistor 238 is a 0.1% 10 k ohm resistor.

Returning to FIG. 2, in a preferred embodiment, each piezo plant 168 is serviced by a separate hysteresis correction circuit 200 and controlled by a closed loop microactuator servo circuit 254 operating within the closed loop servo circuit 180 driving off input from the closed loop servo circuit 180. The closed loop microactuator servo circuit 254 is made up of the servo engine 184 (including the digital signal processor 186, the volatile memory 188), the summing junction 196, the zero-order hold device 198, the piezo driver 194, the piezo plant 168, the sense circuit 202 and the observer 204.

Measurements made during the manufacturing process include the maximum piezo inducement voltage and track-to-track voltage differences between each of the data tracks 140 for each of the heads 138. The maximum piezo inducement voltage for each piezo plant 168 is determined by applying incremental increases in voltage across the piezo plant 168 and monitoring the change in voltage output of the sense circuit 202. When the sense circuit 202 voltage output ceases to change, the actual maximum voltage input to which the piezo plant 168 is capable of responding to has been found. The maximum voltage input values for each of the piezo plants 168 are written to disc 118 in a head-accessible, non-data region of the disc drive 100.

As discussed hereinabove, to facilitate seeks executed by the VCM 142 during operation of the disc drive 100, the control processor DSP 172 queries the processor memory 174 to obtain the seek profile, stored in the lookup table, to be executed by VCM 142 in facilitating the positional adjustment of the head 138. In establishing seek profiles a servo engine adaptation routine is typically carried out during the disc drive 100 manufacturing operation that adapts the servo engine 184 to each head/disc combination. The disc drive 100 is typically placed in an appropriate computer-based workstation (not separately shown) and a first head 138 is selected. Next, a selected input spectrum is provided as an input to the VCM 142 and the MA 168 in order to obtain a plot of the corresponding output response (such as position variation). The input spectrum can comprise random noise, sinusoidal waveforms at incrementally higher frequencies ("swept sine"), etc. The output response information is gathered and provided to a control design routine which provides corresponding precalculated seek profiles for each head disc combination as an output. The seek profiles are then written to the disc 118 in a head-accessible, non-data region of the disc drive 100. One suitable region for writing the velocity profiles, as well as the piezo plant 168 voltage values and differences is on a guard track or a number of guard tracks within the disc drive 100.

Figure 5:
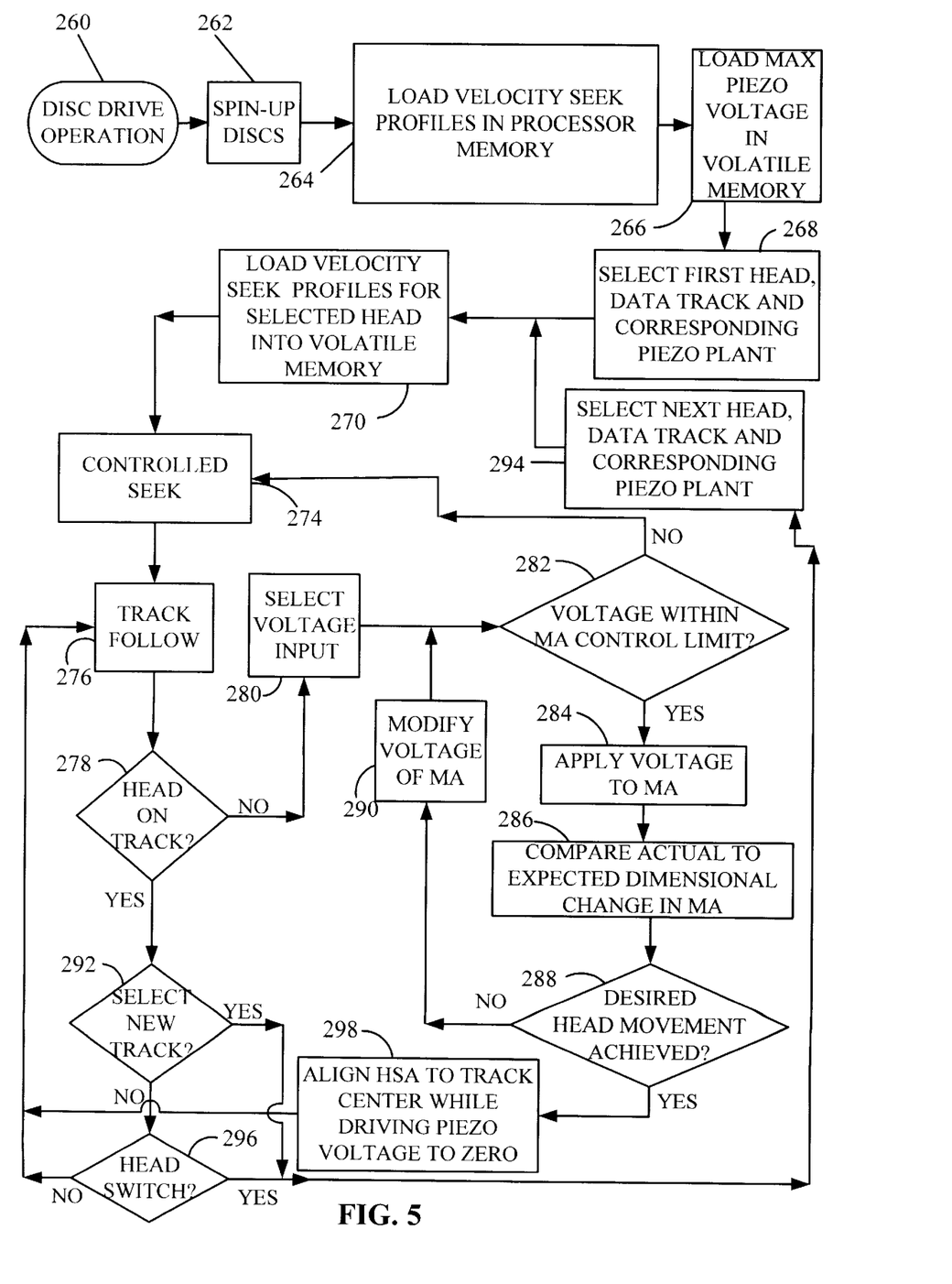
FIG. 5 provides a simplified block diagram showing the operation of the servo engine of FIG. 2.

FIG. 5 provides a disc drive operation routine 260, and generally illustrates steps carried out during operation of the disc drive 100. Upon initialization (spin-up) at step 262 during which the drive is brought from a state of nonoperation to a state of operation, the measurement values taken during the manufacturing process and stored in a head-accessible, non-data region of the disc drive 100 are loaded into tables within the processor memory 174 at step 264 or into tables within the volatile memory 188 and step 266. Next, based on the request from the host computer 170 to disc drive 100, the control processor selects the first head 138 and corresponding piezo plant 168 and the first data track 140, as shown by step 268. Having selected the first head 138 and the first data track 140, the disc drive 100 loads the seek profile for the selected head into the volatile memory 188 of the servo engine 184 as shown by step 270.

With the servo control values loaded into tables within the volatile memory 188, the disc drive 100 executes a controlled seek to the first selected track shown by step 274. At the conclusion of the controlled seek of step 274, the closed loop servo circuit 180 enters the track following mode of process step 276. Having entered the process step 276, the first decision made by the servo system is to verify head 138 is on track as shown by decision step 278. If the selected head 138 is not on track center of the selected data track 140 the servo system enters process step 280 to determine a voltage value to be applied to the piezo plant 168. The voltage level to apply to piezo plant 168 is based on the servo information the head 138 encountered when the disc drive 100 opened the read/write channel 178 following the seek process 274.

Having selected a voltage input for the piezo plant 168, the servo engine 184 checks the maximum voltage input the piezo plant 168 is capable of responding to. If the voltage to be applied to the piezo plant 168 is beyond the response capabilities of the piezo plant 168, the disc drive 100 initiates a new controlled seek at process step 274. However, if the voltage to be applied to the piezo plant 168 is within the capabilities of the piezo plant 168, the disc drive 100 directs the piezo driver 189 to apply the voltage to the piezo plant 168 in accordance with process step 284. In response to voltage applied to piezo plant 168, the strain gauge 210 undergoes a change in resistance corresponding to a change in dimension experienced by the piezoelectric transducer member 212, the sense circuit 202 generates an output voltage corresponding to the actual dimensional change encountered by the piezoelectric transducer member 212 and, in accordance with process step 286, the observer 204 makes a comparison between the actual dimensional change and the expected dimensional change of the piezoelectric transducer 212.

The observer 204 then moves to decision step 288 and decides whether the actual dimensional change the piezoelectric transducer 212 attained coincides with the expected dimensional change. If the actual dimensional change achieved by the piezoelectric transducer member 212 coincides with the expected dimensional change of the piezoelectric transducer member 212, the requested change in head position is deemed to having been achieved. The servo engine 184 of the disc drive 100 proceeds to HSA 128 alignment step 298. Completing process step 298, the servo engine 184 returns to the track follow mode of process step 276. If the actual dimensional change attained by the piezoelectric transducer 212 fails to coincide with the expected dimensional change of the piezoelectric transducer member 212, the observer 204 provides a correction voltage to summing junction 196 to be used in process step 290 to modify the voltage of the piezo plant 168. This voltage application, verification and voltage reapplication mode of process steps 282 through 290 continues under the track following mode of the disc drive 100 through its low-pass response transfer function and serves as a fine mode track following control system for the disc drive 100.

The VCM 142 provides the course track following for the disc drive 100 by maintaining the position of the coil 144 relative to the magnet assembly 146 and operating to bring the HSA 128 to "track center", i.e., bias offset current only, while the piezo plant driving voltage is brought to zero. When the requested head positional change has been achieved, the disc drive 100 continues in the track following mode process step 276 and proceeds to decision step 278. At decision step 278, if the head 138 is on track the disc drive 100 moves to decision step 292 looking for requests to seek to a new track. If such a request is present, the disc drive 100 reenters process step 294 and proceeds as described hereinabove. If there are no requests to seek to a new track, the disc drive 100 moves to decision step 296 and checks for head switch requests. If no head switch requests are present, the disc drive 100 continues in the track following mode of process step 276. However, if a head switch request is present, the disc drive 100 moves to process step 296 and selects the next head 138, the next data track 140 and the piezo plant 168 corresponding to the newly selected head 138 and reenters the disc drive operation routine at process step 270.

Inclusion of the strain gauge 210 to the piezoelectric transducer 212 of the piezo plant 168, the sense circuit 202 and the observer 204 provide the disc drive 100 with the ability to continually fine tune the location of the selected head 138 relative to the selected data track 140 while data transfer functions are ongoing. Head position can be controlled with the piezo plant 168, adjusted for effects of hysteresis from the piezoelectric transducer member 212, by decreasing the voltage driving the piezoelectric transducer member 212 while bringing the current applied to the VCM 142 to a level sufficient to offset the bias encountered by the HSA 128 at a specific data track 140, thereby allowing the head to settle on track more quickly.

In summary, the present invention is directed to an apparatus and method for effectuating hysteresis corrected track following and seek modes of a disc drive 100. In accordance with preferred embodiments, a disc drive such as 100 includes a dual stage actuator such as 128 having a primary actuator motor such as 142 and secondary actuator motors or microactuator motors such as 168, a closed loop servo circuit such as 180 including a hysteresis correction circuit such as 204 and a closed loop piezo servo circuit such as 254 controlling the primary and secondary actuator motors to maintain a head such as 118 adjacent a rotatable disc such as 108.

A demodulator such as 182 provides head position information and a control processor such as 172 provides target data track 140 information to a servo engine such as 184. The servo engine generates a piezo plant input voltage that is passed to a zero-order hold device such as 196. The zero-order hold device holds the piezo plan input voltage until the zero-order hold device receives an update of the piezo plant input voltage. The zero-or hold device outputs a corresponding piezo activation signal to a piezo driver such as 198, which in turn outputs a piezo inducement signal. The microactuator motor responds to the piezo inducement signal by undergoing a dimensional change. The amount of the dimensional change the microactuator motor undergoes is either the amount of adjustment needed for improved head position relative to the data track, or the maximum possible from the microactuator motor in response to a seek request.

A strain gauge such as 210 attached to the microactuator motor, and connected into a sense circuit such as 206, changes resistance in a linear relationship to microactuator motor dimensional changes. The sense circuit generates the displacement signal at a voltage level indicative of a piezo inducement voltage needed to produce a theoretical dimensional change in the microactuator motor equal to the actual dimensional change encountered by the strain gauge. An observer such as 204 compares the actual dimensional change of the microactuator motor to an expected dimensional change in the microactuator motor. The expected dimensional change in the microactuator motor is derived from the original piezo plant input voltage. The observer generates a piezo plant correction voltage. A summing junction such as 196 combines the piezo plant correction voltage and the original piezo plant input voltage to generate a corrected piezo plant input voltage, which serves as an update to the zero-order hold device and used to drive an additional incremental dimensional change in the microactuator motor to achieve the originally desired microactuator motor dimensional change. Simultaneously, and based on position input from the demodulator, the closed loop servo circuit is driving the VCM to position the dual stage actuator such that the current supplied to the VCM by the motor driver is just sufficient to offset an actuator bias experienced by the dual stage actuator at the target track, while reducing the voltage driving the microactuator to zero at a rate commensurate with bringing the current driving the VCM to the bias support level.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for providing hysteresis correction for a microactuator motor which positions a transducing head adjacent a recording surface of a disc drive comprising steps of:

(a) affixing a sensor to a piezoelectric transducer (PZT) element of the microactuator motor to measure dimensional changes of the PZT element;

(b) applying a piezo plant voltage to the PZT element based on head position information transduced from the recording surface;

(c) detecting an actual dimensional change of the PZT element with the sensor, said actual dimensional change induced by said piezo plant voltage; and (d) applying a corrected piezo plant input voltage to the PZT element based on the dimensional change of the PZT element to correct PZT element hysteresis.

2. The method of claim 1 in which the detecting step (c) comprises steps of:

(c1) sensing a resistance change in the sensor;

(c2) generating a sense voltage in response to change in resistance of the sensor, the sense voltage proportional to the actual dimensional change in the microactuator motor; and (c3) comparing the sense voltage to an expected sense voltage with an observer and providing a correction voltage for use in generating the corrected piezo plant input voltage.

3. The method of claim 2 in which the comparing step (c3) comprises steps of:

(c3a) applying the piezo plant input voltage to the observer from a summing junction used to generate an expected piezo plant response voltage;

(c3b) acquiring a sense voltage from the sensor proportional to the actual dimensional change in the PZT element; and (c3c) combining the expected piezo plant response voltage with the sense voltage to provide the correction voltage.

4. The method of claim 1 in which the applying step (d) comprises steps of:

(d1) summing a correction voltage from an observer with the piezo plant input voltage to generate a corrected piezo plant input voltage;

(d2) transmitting the corrected piezo plant input voltage to a zero-order hold device that outputs an activation voltage corresponding to the corrected piezo plant input voltage;

(d3) applying the activation voltage to a driver for generation of an inducement voltage; and (d4) applying the inducement voltage to the microactuator motor.

5. A disc drive, comprising:

a disc pack supporting at least one axially aligned rotatable disc surface having a plurality of adjacent data tracks;

a dual stage actuator with at least one actuator arm and a primary actuator motor support, comprising:

at least one head supported by the actuator arm adjacent the disc surface;

a primary actuator motor supported by the primary actuator motor support providing coarse placement of the heads relative to the disc surface;

a microactuator motor supported by the actuator arm providing fine positional control of the head relative to a selected one of the plurality of adjacent data tracks, the microactuator comprising a piezoelectric transducer (PZT) element which undergoes strain in relation to application of a voltage to said element; and a sensor affixed to the PZT element to measure dimensional change of the microactuator motor; and a servo controller comprising a primary servo control circuit with a closed loop microactuator servo circuit which controls head position relative to the selected data track and corrects hysteresis in the PZT element in relation to the dimensional change measured by the sensor.

6. The disc drive of claim 5 wherein the data tracks include servo information, the servo controller having a seek mode and a track following mode and wherein the primary servo control circuit comprises:

a demodulator conditioning servo information transduced by the head, providing head to data track positional relationship;

a hardware-based servo engine generating primary actuator seek and control signals based on the conditioned servo information, the servo engine directing primary actuator functions;

a set of digital to analog converters converting the seek and control signals to analog control signals used by the primary actuator motor during primary actuator motor functions; and a motor driver directing the analog control signals to the primary actuator motor for executing primary actuator motor functions.

7. The disc drive of claim 5 in which the closed loop microactuator servo circuit comprises:

a zero-order hold device receiving a piezo control signal and providing a corresponding activation signal;

a piezo driver which provides an inducement signal to the PZT element in response to the activation signal; and a sense circuit which provides a voltage output in response to the dimensional change of the PZT element induced by the inducement signal.

8. The disc drive of claim 7 in which the sensor comprises a strain gauge, and in which the sense circuit comprises:

a resistor bridge network with the strain gauge providing a first leg of the resistor bridge network;

a pair of operational amplifiers connected to the resistor bridge network measuring a change in voltage caused by a change in resistance of the strain gauge; and a voltage source applied across the resistor bridge network supplying voltage to the resistor bridge network and the operational amplifiers.

9. The disc drive of claim 8 in which the resistor bridge network comprises three additional legs and wherein resistance of each of the additional legs is substantially matched to a predetermined resistance of the strain gauge.

10. A disc drive, comprising:

a dual stage actuator supporting a head adjacent a rotatable disc surface and comprising a primary actuator motor providing coarse placement of the head relative to the disc surface and a microactuator motor providing fine positional control of the head relative to the disc surface, the microactuator motor comprising a piezoelectric transducer (PZT) element and a sensor affixed to the PZT element; and means for correcting hysteresis in the PZT element in relation to dimensional change in the PZT element measured by the sensor.

* * * * *